(No Model.) 2 Sheets—Sheet 1.

F. SIEB.
COMBINED FLOUR BIN AND SIFTER.

No. 370,093. Patented Sept. 20, 1887.

Witnesses
Jos. A. Ryan
C. E. Doyle

Inventor
Fred Sieb
By his Attorneys,
C. A. Knowles (No Model.) 2 Sheets—Sheet 2.
F. SIEB.
COMBINED FLOUR BIN AND SIFTER.
No. 370,093. Patented Sept. 20, 1887.
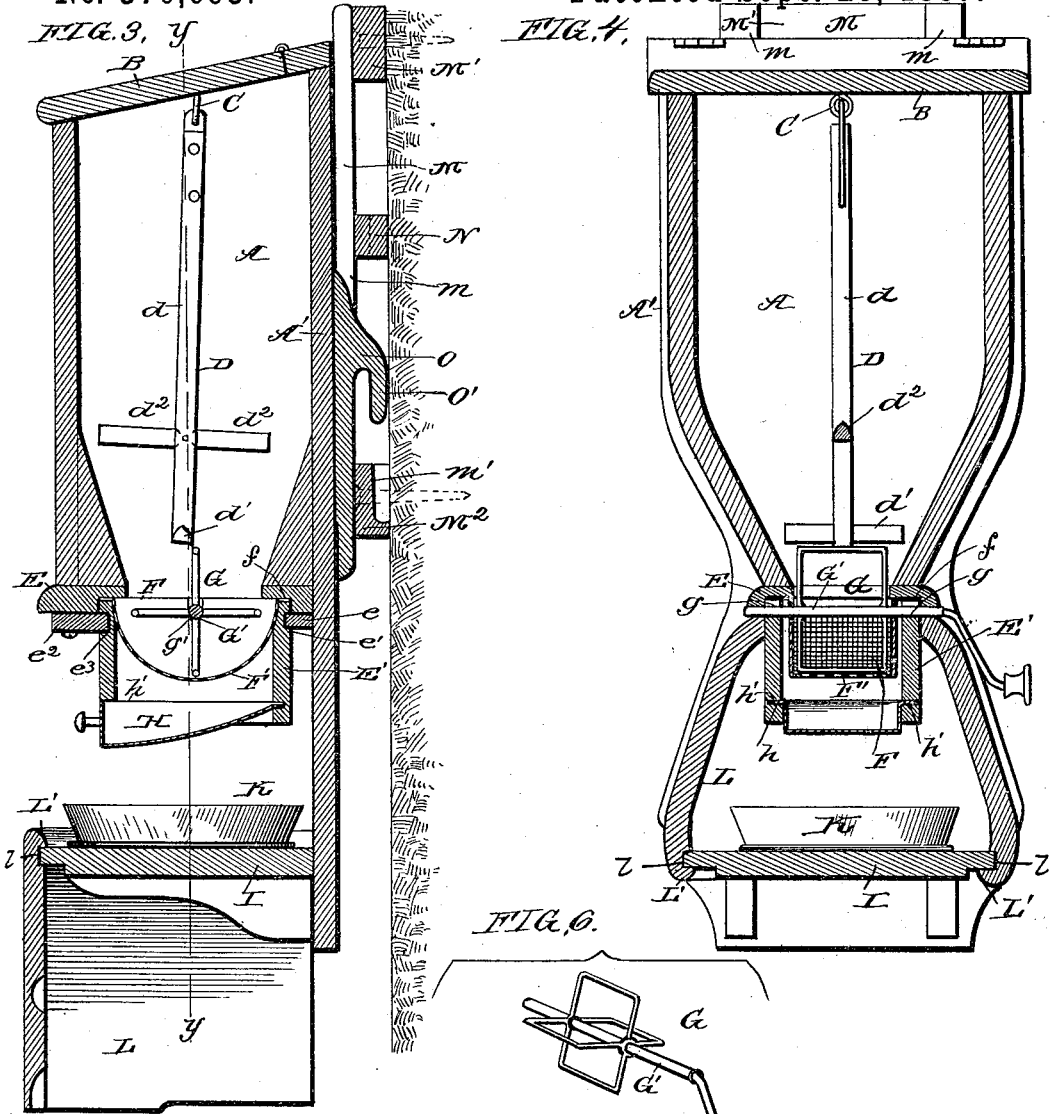
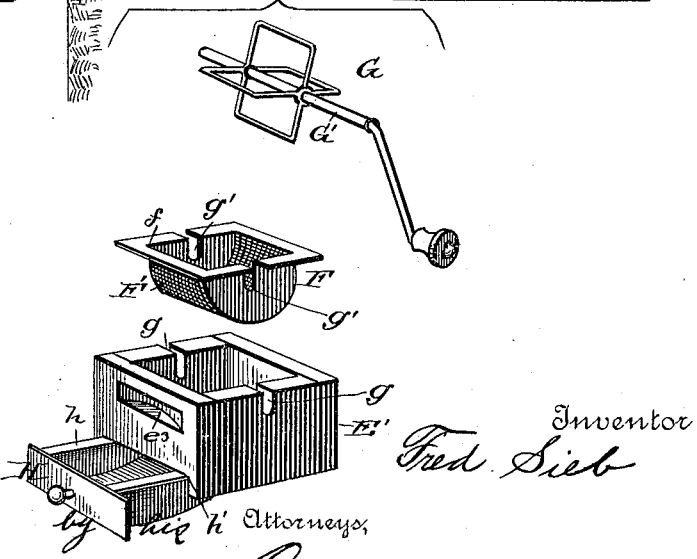
Witnesses
Inventor
Fred Sieb

UNITED STATES PATENT OFFICE.

FRED SIEB, OF NASHVILLE, ILLINOIS.

COMBINED FLOUR BIN AND SIFTER.

SPECIFICATION forming part of Letters Patent No. 370,093, dated September 20, 1887.

Application filed March 12, 1887. Serial No. 230,693. (No model.)

*To all whom it may concern:*

Be it known that I, FRED SIEB, a citizen of the United States, residing at Nashville, in the county of Washington and State of Illinois, have invented a new and useful Improvement in Combined Flour Bins and Sifters, of which the following is a specification.

My invention relates to improvements in combined flour bins and sifters, and has for its objects, first, the provision of means whereby the said bin and sifter may be secured to the wall without coming in direct contact therewith, so as to absorb moisture and render the flour damp and moldy, and also to secure it in such a manner that it may be easily detached from the wall as often as desired without damaging the plaster thereof; further, the provision of means whereby the parts of the sifter may be easily separated to enable them to be more readily cleaned; further, to provide means whereby the flour in the bin may be prevented from collecting in lumps, thus rendering it difficult to sift; further, to provide a hood or cover for the lower part of the device containing the pan into which the flour is sifted, to prevent dust and dirt from collecting on said parts when the sifter is not in use.

My invention consists in certain details of construction, hereinafter fully described, pointed out in the appended claims, and illustrated in the accompanying drawings, in which—

Figure 1:
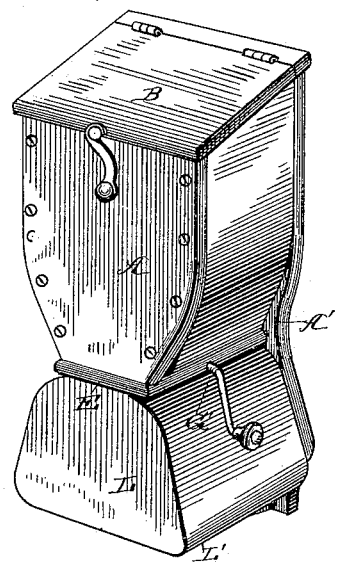
Figure 2:
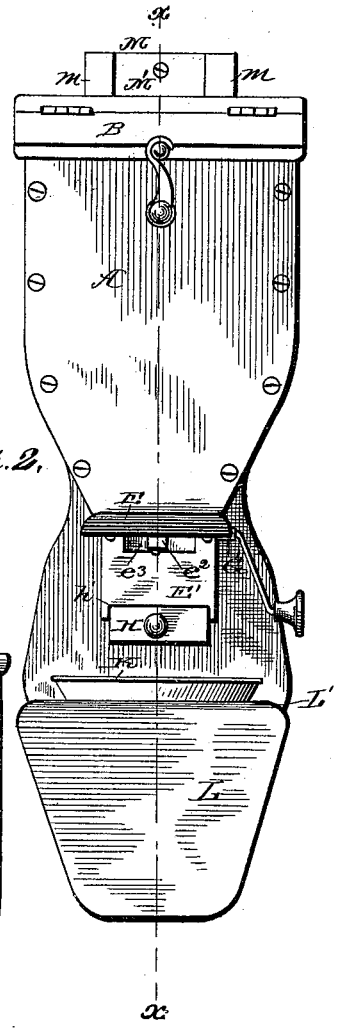
Figure 5:
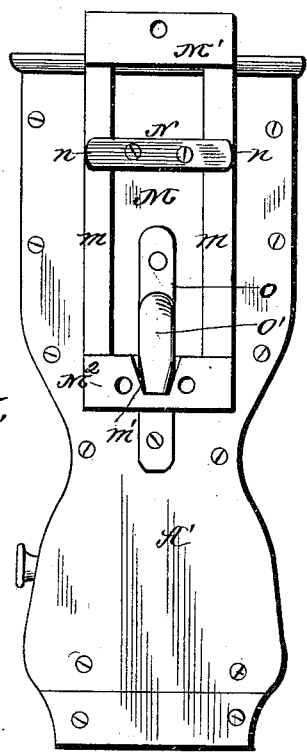

Figure 1 is a perspective view of the device as seen when not in use. Fig. 2 is a front elevation of the same as seen when in operative condition. Fig. 3 is a vertical section on line $x$ $x$ of Fig. 2. Fig. 4 is a similar view on line $y$ $y$ of Fig. 3. Fig. 5 is a rear view of the bin and rack, the latter being detached from the wall to show manner of engaging bin thereto. Fig. 6 is a detail view of the sifter, showing the parts thereof detached.

Referring to the drawings, in which similar letters denote corresponding parts in all the figures, A designates the bin or receptacle for the flour, the sides of which converge toward the bottom; and B is the hinged lid on the top of the said bin, having the staple C secured in the under side thereof, to which is suspended the breaker or agitator D, comprising the vertical bar $d$, short lateral arms $d'$ $d'$ at the lower end thereof, and the longer lateral arms, $d^2$ $d^2$, some distance above and at right angles to the arms $d'$. The upper sides of the said lateral arms $d'$ $d^2$ are sharpened to an edge to prevent the flour from lodging thereon.

E is a flange formed around the outer edge of the lower end of the bin, adapted to receive the upper edge of the box E′, which supports the sifter. $e$ is a short detent or stud secured on the under side of the flange E at the back of the sifter, and projecting forwardly into a recess, $e'$, formed in the rear side of the said box; and $e^2$ is a swiveled button secured on the under side of the said flange at the front of the sifter, and adapted, when swung around, to enter a recess, $e^3$, formed in the front side of the sifter-box, to hold said box in the proper position within the said flange. It will readily be seen that to disengage the sifter from the bin it is only necessary to turn the button $e^2$ out of engagement with the recess in the box, when the front end of said box will drop down and out of contact with the flange and allow the recess $e'$ to be disengaged from the stationary stud or detent $e$ in rear of box.

F represents the sieve proper, situated within the box E′, and having a semicircular wire-gauze bottom, F′, and the lateral flange $f$ around the upper edge, to rest on the upper edge of the box E′, and thus hold the sieve in position in the box.

G is the rotating agitator, journaled in bearings $g$ $g$, formed in the upper edges of opposite sides of the box E′, $g'$ $g'$ being slots formed in the upper edges of the sieve to align with the bearings in the box and allow the shaft G′ of the agitator to pass down into the said bearings $g$ $g$. The arms of the said agitator G are adapted, when the said dasher is rotated, to strike against the lower end of the vertical agitator D and keep it in constant motion. The said agitator G does not strike against the agitator D with force sufficient to impede its own motion, but just sufficient to slightly agitate the latter and prevent the flour from becoming packed in the bin.

H represents a small drawer formed in the shape of a scoop, and having the lateral flanges $h$ to slide in grooves $h'$ in the inside of the lower edges of the box E′, said scoop being adapted to close the lower part of the said box under the sieve and receive the droppings therefrom, and also to receive a small quantity of flour when it is not necessary or convenient to use a large pan.

A' is the back of the bin A, which is extended down a considerable distance below the lower end of the said bin; and I represents a shelf secured to the said back near the lower end thereof, and adapted to hold the flour-pan K under the sieve while sifting.

L designates a hood or cover comprising a front and two sides, and having a groove, $l$, around the inner side near the lower edge thereof, which groove is adapted to receive the edges of the shelf I, and the hood is designed to extend up the under side of the flange E on the under side of the bin and rearwardly to the back board, A', thus completely inclosing the space under the bin, including the sifter and the flour-pan thereunder. This hood is designed to protect the said sifter and pan from dust when the device is not in use, and when it is desired to use the same the hood is withdrawn, inverted, and secured on the under side of the shelf by re-engaging the groove $l$ with the edges of the said shelf, as clearly shown in Fig. 3. In this position the portion of the hood which is between the groove $l$ and the lower edge of the same forms a flange, L', around the shelf, to prevent the pan K from being pushed or jarred off during the operation of sifting.

The means for securing the bin and sifter to the wall is as follows:

M is a rack comprising the upper and lower transverse bars, M' M$^2$, and the parallel vertical bars $m$ $m$, secured at the upper and lower ends, respectively, to the ends of the bars M' M$^2$ on the outside thereof, (namely, away from the wall,) thus causing the said bars $m$ to be held some distance out from the wall. A small recess, $m'$, is formed in the upper side of the transverse bar M$^2$, (for a purpose hereinafter explained,) and the said bars M' M$^2$ are secured by screws or other equivalent means to the wall.

N is a T-shaped stud or detent secured to the rear side of the bin, the lateral arms $n$ $n$ of which are adapted to engage in rear of the vertical bars $m$ of the rack, (between said arms and the wall,) it being necessary to turn the said bin into an inclined or horizontal position to insert the said arms $n$ $n$ behind the bars.

O is a vertical rib or web, also secured to the rear side of the bin beneath the detent N, the said rib having a rearwardly and downwardly extending stub or projection, O', to engage in the recess $m'$ in the transverse bar M$^2$.

To detach the bin from the rack M, raise it slightly to lift the detent O' out of the recess $m'$, draw the lower end of the bin out slightly from the rack to prevent the said detent from re-engaging in the recess, and pass the T-shaped detent N down to the lower end of the rack, when, if the bin is inclined, said detent may be disengaged from the bars $m$. This feature is also of advantage in filling the bin with flour, as the said bin may be thereby lowered within easier reach of the person using the device. Also, there is no chance of the bin becoming detached accidentally and falling, as it is necessary (as has been described) to first lift the bin slightly before it can be moved, and must be inclined to a considerable extent before it can be entirely detached.

It will be seen that the parts of the sifter are detachable, thus facilitating to a great extent the cleaning thereof by enabling each part to be treated separately. Also, the means which I provide for attaching the sifter to the lower end of the bin enables said sifter to be more easily, quickly, and safely applied than with the means heretofore provided for the purpose. Also, the breaker or agitator which I provide for preventing the lumping of the flour in the bin is a great improvement, for the reason that, as the agitator is designed to very slightly touch the lower end of the breaker when being turned, said breaker is kept in motion and effectually prevents the clogging of the sifter.

Further, my improved bin and sifter is an extremely neat, compact, and durable article adapted to effectively accomplish the work for which it is designed.

Having thus described my invention, I claim—

1. The flour-bin A, combined with the breaker D, connected to the lid thereof, and comprising the bar $d$ and lateral arms projecting therefrom, and means to operate the said breaker, substantially as described.

2. The flour-bin A, combined with the breaker D, comprising the vertical bar $d$, having lateral arms $d'$ $d^2$, which are sharpened on the upper side, and means to operate the said breaker, substantially as described.

3. The flour-bin A, the sifter attached thereto, and an agitator therein, combined with the breaker D, suspended in the bin and adapted to be kept in motion by the operation of the said agitator, substantially as described.

4. The flour-bin A, sifter attached thereto, and the agitator operating therein, combined with the breaker suspended loosely from the under side of the lid of the said bin, removable therewith, and adapted to be kept in motion by the said agitator, substantially as specified.

5. The combination, with the bin A, of the sifter comprising the box E', screen F, and agitator G therein, and the drawer H, made in the shape and adapted to serve as a scoop to fit in the lower side of the box, substantially as described.

6. The combination, with the bin A and the sifter having the box E', provided with a groove, $h'$, around the inside of the lower edge, of the scoop H, having flange $h$ around the edges thereof to fit in the groove $h'$, said scoop being adapted to act as a drawer, substantially as described.

7. The combination, with the bin A and the shelf I under the lower end thereof, of the hood or cover L, having the groove $l$ around the inner lower edge to receive the edges of the shelf I, to support the said hood in position, substantially as specified.

8. The combination, with the bin A and the shelf I thereunder, of the hood L, having a groove, $l$, around the inner lower edge, and the flange L' below the said groove, the hood being adapted to be inverted and secured with the edges of the shelf in the groove $l$, in which position the flange L' stands up above the edge of the shelf to prevent articles on the shelf from slipping from the same, substantially as specified.

9. The combination, with the bin A and the shelf I under the lower end thereof, of the hood L, engaging at the lower edge with the said shelf and closing up around the lower end of the bin, the said hood being adapted to be inverted and suspended from the under side of the shelf, the edge thereof in the said position serving as a flange around the shelf, substantially as specified.

10. The combination, with the bin having the detent N on the rear side, provided with lateral arms, and the depending lug or detent O', of the rack having vertical parallel arms $m\ m$, adapted to pass between the rear side of the bin and the said lateral arms, and the transverse bar $M^2$, having the notch or socket $m'$ in the upper side to receive the detent or lug O', substantially as specified.

11. The rack M, comprising the vertical bars $m\ m$ and transverse bars M' and $M^2$ at the upper and lower ends, respectively, the said bar $M^2$ having a socket, $m'$, in the upper side, combined with the bin A, having the detent N on the rear side, provided with lateral arms $n\ n$ to engage in rear of the vertical bars $m$, and the depending lug or detent O', secured to the said bin below the detent N, and adapted to engage in the socket $m'$ when the bin is raised near the upper end of the rack, substantially as specified.

In testimony that I claim the foregoing as my own I have hereto affixed my signature in presence of two witnesses.

FRED SIEB.

Witnesses:
 WM. GRUHS,
 RUDOLPH SCHEURER.